June 28, 1932. H. W. MUHLEISEN 1,864,664
ANIMAL TRAP
Filed Jan. 20, 1930
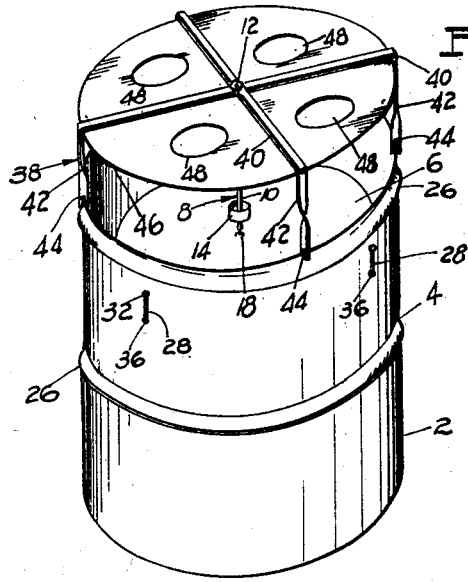
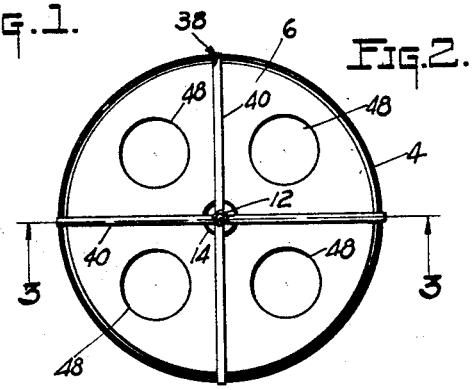
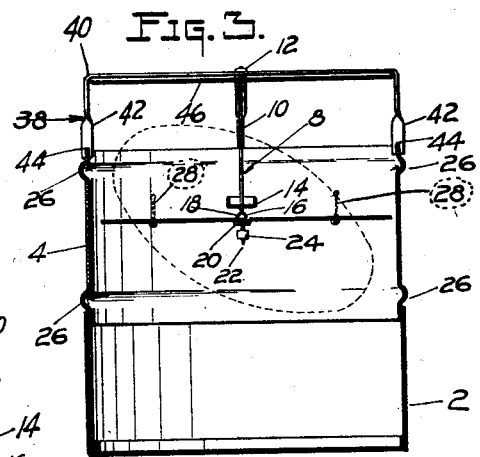
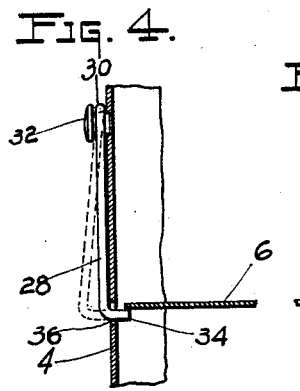
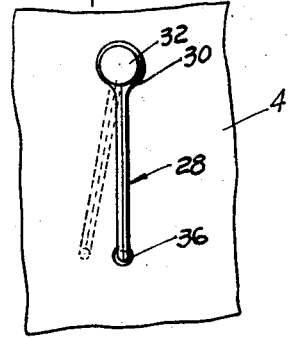
Inventor
H.W. MUHLEISEN
By Fred D. Hayn
Attorney Patented June 28, 1932

1,864,664

UNITED STATES PATENT OFFICE

HENRY W. MUHLEISEN, OF LOS ANGELES, CALIFORNIA, ASSIGNOR OF ONE-HALF TO RACHEL M. MARTIN, OF LOS ANGELES, CALIFORNIA

ANIMAL TRAP

Application filed January 20, 1930. Serial No. 422,037.

My invention relates to animal traps for trapping animals of all kinds and is especially adapted for trapping those of the rodent type which are especially difficult to entice into traps of any sort, said rodents being particularly shy of entering such traps.

It accordingly is an object of my invention to provide a novel form of trap, which may be of cylindrical form, a receptacle or container having associated therewith a preferably detachable casing, which casing has mounted therein a tiltable platform, preferably centrally mounted by means of a bait holder depending from an animal entry means, which may be detachably associated with said casing, means which may be in the shape of a set of swinging locking keys, being provided for temporarily locking said platform against tilting.

It is also within the province of my invention to provide a novel form of animal entry means comprising a skeleton frame and a perforated plate whereby the animals may enter in a plurality of ways.

The above and further objects and advantages of my invention, as will hereinafter more fully appear, I attain by the construction described in the specification and illustrated in its preferred form on the drawing, forming a part of my application.

Reference is had to the accompanying drawing, in which similar reference characters denote similar parts. In the drawing, Fig. 1 is a perspective view of one form of my invention in assembled position, the platform being locked, Fig. 2 is a top plan view of Fig. 1, Fig. 3 is a cross-sectional view, taken on the line 3—3, Fig. 2, the dotted lines illustrating how the platform may be tilted, Figs. 4 and 5 are fragmentary detail views on an enlarged scale illustrating the locking keys, and the manner in which they are adapted to temporarily lock the platform, and Fig. 6 is a similar view of the combined bait holder and platform supporting means, with center weight adjusting means.

Describing my invention more in detail, in its broader aspects said invention comprises a suitable animal receiving receptacle or container, which may contain water or an insecticide for skilling the vermin, rodents or the like, which receptacle has associated therewith in any preferred way a preferably open ended casing, in which casing is positioned a tiltable platform, preferably mounted centrally by means of a combined bait holder and platform supporting means said casing having also associated therewith an animal entry means of conventional or special form, and a means, such as a plurality of any preferred number of locking keys for temporarily locking said platform against tilting.

More specifically, my invention comprises a novel form of trap which may be so adjusted as to remain inoperative, and baited, so the animals may be lured therein, after which, when the suspicions of said animals are allayed said trap may be set and the animals either captured or destroyed.

To this end I provide an animal receptacle or container 2, of any preferred form, such as cylindrical, over which may be superposed on and preferably detachable therewith, a casing 4, which may be open-ended, as seen more particularly in Fig. 3.

The casing 4 is provided with a tiltable platform 6, which is preferably centrally mounted in said casing by means of the combined bait holder and platform supporting means, designated generally by the reference numeral 8, said platform being preferably positioned in said casing between the ends thereof.

The combined bait holder and platform supporting means comprises a preferably screw-threaded rod 10, being threaded at the top and provided with a suitable securing means, such as the nut 12, so that said means may depend from the animal entry means, presently to be described.

At any convenient point, the rod 10 may be provided in any manner preferred with a suitable bait holder, such as the cup 14, said cup being positioned above the platform 6, and below the cup 14, the rod 10 may be provided with a suitable eye 16 to receive the staple 18 secured to said platform 6 in any preferred way.

If desired the platform 6 may be provided centrally with a boss 20, from which extends a screw threaded stem 22, adapted to receive the counter weight 24, which weight may be adjusted on said stem in order to adjust the tendency of said platform to tilt so as to accommodate the weight of the particular animal sought to be trapped or destroyed. If desired, the casing 4 may be provided with suitable stiffening ribs 26, of any preferred number, one of which, preferably the lower one, may function as a stop for said casing in connection with the container 2, both of which may be constructed of any preferred material. It will be of course understood, that any other means for mounting the tiltable platform 6 on the means 8 may be used.

To temporarily lock the platform 6 against tilting, so the animals may be lured within the casing 4, I may use any preferred means, but preferably provide a special means in the shape of a set of keys 28, which may be constructed of one single length, and doubled at one end, and curved to form an eye 30, to encircle a headed support 32, secured as desired to the casing 4. The ends of the keys 28 are bent at one end, as at 34, which ends are held together and are passed through openings 36 (Figs. 4 and 5) in the casing 4, so that said ends will support the platform 6 (Fig. 4) against tilting. The double character of the keys 28 prevents their accidental disengagement when the platform 6 is locked.

As hereinbefore stated, the animal entry means associated with the casing 4 may be any in practice desired, but I prefer to provide a plural entry means, designated generally by the reference numeral 38, which means may be of skeleton form and consist of any preferred number of angular members 40, which overlap at the center, and are there perforated to receive the threaded end of the rod 10, which, as before stated, may be held in place by the nut 12.

The depending portions of the members 40, are preferably twisted as at 42, for the sake of rigidity, and also to provide a mounting in the shape of open-ended slots 44 whereby the animal entry means may be detachably associated with the casing 4. Of course, any other preferred mounting may be substituted.

If desired, the skeleton frame 38 may have secured thereto in any manner preferred, the perforated plate 46, provided with animal entry holes 48, of suitable dimensions. The device 38 may be constructed of any preferred material, and the angular members 42 of heavier material to provide for sufficient strength, especially when the traps are constructed of large sizes.

In operation, the tiltable platform 6 is locked by means of the keys 28, holding said platform against tilting, after which bait is carelessly thrown on said platform. The animals, attracted by the bait, enter at the top and sides of the device 38, eat the bait, and becoming confident, lure others to the trap. This may be done for one or more days until confidence of the animals is insured, after which the keys 28 are pulled out, and the cup 14 supplied with bait. The instant the animal steps on the platform 6, said platform is tilted by the weight of said animal to cause said platform to assume the position shown in dotted lines, Fig. 3, whereupon said animal will fall into the container 2, where it is drowned, killed or trapped.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. An animal trap including an open-topped animal receiving container, an open-ended casing detachably connected with said container, stop means juxtaposed to the lower portion of said casing to engage the top of said container, an animal entry means having a set of depending members adapted to rest upon the top edge of said casing, a tiltable platform suspended from said animal entry means, and positioned within said open ended casing, a bait holder positioned above said platform, and means for adjusting said platform to the weight of the animals to the trapped.

2. An animal trap comprising an animal receiving receptacle, an open ended casing detachably connected to said receptacle, an animal entry means detachably connected with said open-ended casing; said means being provided with side and top openings to admit said animals in a plurality of ways, a tiltable platform positoned within the confines of said detachable casing, means for suspending said platform from said animal entry means, a bait holder connected with said platform, and angular means connected to said casing for preventing said platform from tilting.

3. An animal trap comprising an animal receiving container, an open-ended casing insertable in said container, a tiltable platform positioned within the confines of said open-ended casing, an animal entry means adapted to rest upon the top edge of said casing, there being top and lateral openings in said animal entry means whereby animals may enter said trap in a plurality of ways, a rod depending from said animal entry means within said casing, means for tiltably connecting said platform to said rod, a bait holder on said rod, and a set of double angular platform engaging means for preventing said platform from tilting.

4. In an animal trap including an animal receiving receptacle, an animal entry means for said receptacle, comprising a plate having a set of animal receiving holes, a set of supports depending from said plate and positioned above said receptacle, the spaces between said supports being adapted to function as a lateral animal entry means, a tiltable platform suspended from said plate, and a bait holder positioned upon said platform.

5. In an animal trap, an animal receiving container, a casing insertable in said container, an animal entry means positioned on said casing and provided with top and side openings whereby the animals may enter the trap in a plurality of ways, a tiltable platform suspended from said animal entry means and positioned within said casing, a bait holder positioned above said platform, and a set of double looped swinging keys connected to said casing for temporarily locking said platform against tilting, said keys each having bent ends adapted to spread apart to prevent accidental disengagement from said platform.

6. In an animal trap, an animal receiving receptacle, a casing insertable in said receptacle, an animal entry means positioned on said casing, and comprising a perforated plate, a set of angular members secured to said plate, twisted depending members connected to said angular members, said depending members being provided with means for engaging said casing, a tiltable platform positioned within said casing and above said receptacle, means for suspending said platform from said animal entry means, a bait holder positioned above said platform, and lock means connected to said casing for preventing said platform from being tilted.

In testimony whereof I have signed my name to this specification.

HENRY W. MUHLEISEN.